United States Patent
Hanson et al.

(10) Patent No.: US 8,010,909 B1
(45) Date of Patent: Aug. 30, 2011

(54) DERIVED HIERARCHY METHODS AND SYSTEM FOR DEFINITION, VISUALIZATION AND EDITING OF DATA

(75) Inventors: Adam R. Hanson, Woodstock, GA (US); Valdemar V. Lovicz, Atlanta, GA (US); Pam Matthews, Atlanta, GA (US); John B. McAllister, Marietta, GA (US); Charles G. M. Thompson, Cumming, GA (US)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 11/671,804

(22) Filed: Feb. 6, 2007

Related U.S. Application Data

(60) Provisional application No. 60/765,704, filed on Feb. 6, 2006.

(51) Int. Cl.
*G06F 3/048* (2006.01)
(52) U.S. Cl. ......... 715/853; 715/854; 707/810; 707/796
(58) Field of Classification Search .......... 715/853–854; 707/2–5, 102, 810, 802, 737, 738, 796, 797
See application file for complete search history.

(56) References Cited

U.S. PATENT DOCUMENTS

| | | | | |
|---|---|---|---|---|
| 5,701,453 A * | 12/1997 | Maloney et al. | ................... | 707/2 |
| 5,724,577 A * | 3/1998 | Exley et al. | ................... | 707/100 |
| 5,734,887 A * | 3/1998 | Kingberg et al. | ................. | 707/4 |
| 6,154,750 A * | 11/2000 | Roberge et al. | ............ | 707/104.1 |
| 6,301,586 B1 * | 10/2001 | Yang et al. | ........................... | 1/1 |
| 6,343,291 B1 * | 1/2002 | Goldman | ...................... | 707/802 |
| 6,598,042 B1 * | 7/2003 | Kienan | ............................... | 1/1 |
| 7,010,518 B1 * | 3/2006 | Bedell et al. | ........................... | 1/1 |
| 2001/0034733 A1 * | 10/2001 | Prompt et al. | ................ | 707/102 |
| 2003/0065659 A1 * | 4/2003 | Agarwal et al. | .................... | 707/4 |
| 2003/0204514 A1 * | 10/2003 | Owens et al. | ................ | 707/100 |
| 2004/0083222 A1 * | 4/2004 | Pecherer | ...................... | 707/100 |
| 2004/0168199 A1 * | 8/2004 | Phillips et al. | .................. | 725/120 |
| 2004/0267779 A1 * | 12/2004 | Carter et al. | ................. | 707/100 |
| 2005/0050069 A1 * | 3/2005 | Vaschillo et al. | ............. | 707/100 |
| 2006/0036568 A1 * | 2/2006 | Moore et al. | ...................... | 707/1 |

* cited by examiner

*Primary Examiner* — Weilun Lo
*Assistant Examiner* — Rashedul Hassan
(74) *Attorney, Agent, or Firm* — Merchant & Gould

(57) ABSTRACT

A method, system, and program product for creating a logical hierarchy for visualization and editing of data stored in a relational database. A plurality of data entities and relationships are first determined. A plurality of information on the structure of the relational database is maintained within a schema of control tables. A hierarchy path to impose on the relational database is defined interactively. A hierarchical visualization of data in the relational database is then presented on a user interface using the defined hierarchy path. Editing of the logical hierarchy presented on the user interface automatically edits data stored in the relational database.

54 Claims, 18 Drawing Sheets

Customer Table 601

| ID | Code | Name | Education_ID | Occupation_ID | MaritalStatus_ID | Gender_ID | PostalCode_ID |
|----|------|------|--------------|---------------|------------------|-----------|---------------|
| 1 | 1906 | Lewis, Ian | 2 | 1 | 1 | 1 | 2 |
| 2 | 1907 | Pal, Bonnie | 1 | 1 | 1 | 2 | 1 |
| 3 | 1908 | Rodriguez, Ian | 1 | 1 | 1 | 1 | 4 |
| 4 | 1959 | Hughes, Chloe | 4 | 2 | 2 | 2 | 3 |
| 5 | 1960 | Butler, Antonio | 4 | 2 | 2 | 1 | 5 |
| ... | | | | | | | |
| n | 2943 | Ramirez, Sara | 4 | 2 | 2 | 2 | 2 |

Education Table 602

| ID | Code | Name |
|----|------|------|
| 1 | Bachelors | Bachelors |
| 2 | Graduate Degree | Graduate Degree |
| 3 | High School | High School |
| 4 | Partial College | Partial College |
| 5 | Partial High School | Partial High School |

FIG. 6

701 — Entity Table

| Column | Description |
| --- | --- |
| ID | primary key |
| Model_ID | entity is associated with this data model |
| Name | entity name |
| EntityTable | name of entity table |
| HierarchyTable | name of hierarchy relationship table |
| HierarchyParentTable | name of hierarchy parent table |

702 — Attribute Table

| Column | Description |
| --- | --- |
| ID | primary key |
| Entity_ID | attribute is associated with this entity |
| DomainEntity_ID | related entity serving as domain of attribute |
| AttributeType_ID | type of attribute, such as domain-based or free-form input |
| MemberType_ID | indicates restricted application to certain member types |
| Name | name of the foreign key column for the attribute |
| DisplayName | display name of the attribute column |
| DataType_ID | data type of the attribute |

703 — Hierarchy Table

| Column | Description |
| --- | --- |
| ID | primary key |
| Entity_ID | hierarchy is associated with this entity |
| Name | hierarchy name |
| Mandatory_ID | indicates forced participation of all members in hierarchy |

704 — Derived Hierarchy Table

| Column | Description |
| --- | --- |
| ID | primary key |
| Name | derived hierarchy name |
| Model_ID | derived hierarchy is associated with this data model |

705 — Derived Hierarchy Detail Table

| Column | Description |
| --- | --- |
| ID | primary key |
| DerivedHierarchy_ID | master derived hierarchy record |
| Level | level number of the derived hierarchy |
| Entity_ID | entity associated with level of derived hierarchy (top level only) |
| Attribute_ID | attribute associated with level of derived hierarchy (not applicable to top level) |
| Name | display name of the level |
| Visible_ID | visible/invisible indicator for the level |

FIG. 7

Above Example Data in Alternative, Example, De-normalized View Formats

Parent-Child View

| Level Num | Child ID | Child Code | Child Name | Parent ID | Parent Code | Parent Name |
|---|---|---|---|---|---|---|
| 1 | 21 | Bellflower | Bellflower | 0 | ROOT | |
| 1 | 22 | Bellingham | Bellingham | 0 | ROOT | |
| 2 | 15 | 62964 | 62964 | 21 | Bellflower | Bellflower |
| 2 | 16 | 34155 | 34155 | 22 | Bellingham | Bellingham |
| 3 | 13 | 1980 | Taylor, Samantha | 15 | 62964 | 62964 |
| 3 | 10 | 1994 | Yang, James | 15 | 62964 | 62964 |
| 3 | 11 | 2091 | Ross, Brianna | 16 | 34155 | 34155 |
| ... | | | | | | |

↗ 1714

Level View

| Lev1 ID | Lev1 Code | Lev2 Name | Lev2 ID | Lev2 Code | Lev2 Name | Lev3 ID | Lev3 Code | Lev3 Name |
|---|---|---|---|---|---|---|---|---|
| 21 | Bellflower | Bellflower | 15 | 62964 | 62964 | 13 | 1980 | Taylor, Samantha |
| 21 | Bellflower | Bellflower | 15 | 62964 | 62964 | 10 | 1994 | Yang, James |
| 22 | Bellingham | Bellingham | 16 | 34155 | 34155 | 11 | 2091 | Ross, Brianna |
| ... | | | | | | | | |

DERIVED HIERARCHY METHODS AND SYSTEM FOR DEFINITION, VISUALIZATION AND EDITING OF DATA

CROSS-REFERENCE TO RELATED APPLICATION

The present patent application is a formalization of a previously filed, co-pending provisional patent application entitled "Derived Hierarchy Methods and System for Definition, Visualization, and Editing of Data," filed on Feb. 6, 2006, as U.S. patent application Ser. No. 60/765,704 by the inventors named in this patent application. This patent application claims the benefit of the filing date of the cited provisional patent application according to the statutes and rules governing provisional patent applications, particularly 35 USC §119 (e)(1) and 37 CFR §§1.78(a)(4) and (a)(5). The specification and drawings of the provisional patent application are specifically incorporated herein by reference.

BACKGROUND OF THE INVENTION

Historically, most transaction systems use relational database platforms with a normalized data model to efficiently store data and manage updates. While the relationships stored in the normalized data model are the basis for hierarchical consolidations, transaction systems tend to provide form-based or tabular views to users for viewing and updating of information. This architecture is highly efficient for transaction processing and integrity.

Normalization is the process of structuring relational database schema to remove most redundancies and inconsistencies. The stages of normalization are referred to as normal forms, ranging from the least restrictive first normal form to the most restrictive fifth normal form. Generally, each higher normal form must meet all the requirements of each lower normal form in addition to meeting the specific requirements of the higher normal form. Most relational database designs meet the requirements of the third normal form (3NF) rules in which all columns are removed that do not depend on the primary key. In other words, all non-key attributes are mutually independent.

Many computer software applications for reporting and analysis, such as data warehouses and Online Analytical Processing (OLAP) applications, use hierarchical representations of data relationships (hierarchies) to support user visualization of the relationships and provide a navigation path from summary data to detail data and vice versa. Current software applications that provide both hierarchical visualization and hierarchy editing capabilities to users rely on specialized or proprietary data stores which often require duplication of data from transactional or other systems.

SUMMARY OF THE INVENTION

The present invention is directed to a method and system for providing data storage in a third-normal form database whose schema is custom-fit to a particular data set and optimized for relational integrity while enabling flexible definition of multiple desired hierarchy paths for visual hierarchical presentation to users and editing by users without duplication of data for multiple hierarchies. Drag-and-drop style editing of a hierarchy can be translated to relational change transactions of member attributes.

In one aspect of the invention, a method, system, and program product are provided for creating a logical hierarchy for visualization and editing of data stored in a relational database. In the method, a plurality of data entities and relationships are first determined. A plurality of information on the structure of the relational database is maintained within a schema of control tables. A hierarchy path to impose on the relational database is defined interactively. A hierarchical visualization of data in the relational database is then presented on a user interface display using the defined hierarchy path. Editing of the logical hierarchy presented on the user interface display automatically edits data stored in the relational database. The computer program product implements the method for creating a logical hierarchy for visualization and editing of data stored in a relational database. The system includes a processor executing a plurality of software components for performing the steps of the method.

BRIEF DESCRIPTION OF THE DRAWINGS

These and other advantages and aspects of the present invention will become apparent and more readily appreciated from the following detailed description of the invention taken in conjunction with the accompanying drawings, as follows.

FIG. 6 illustrates samples of an example customer data model.

FIG. 7 illustrates an exemplary embodiment of a schema for the metadata model.

FIG. 17A-17C illustrate sample data shown in contrasting formats: hierarchical visual display, normalized storage and de-normalized views.

DETAILED DESCRIPTION OF THE INVENTION

The following description of the invention is provided as an enabling teaching of the invention and its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances, and are a part of the present invention. Thus, the following description is provided as illustrative of the principles of the present invention and not in limitation thereof, since the scope of the present invention is defined by the claims.

Figure 1:
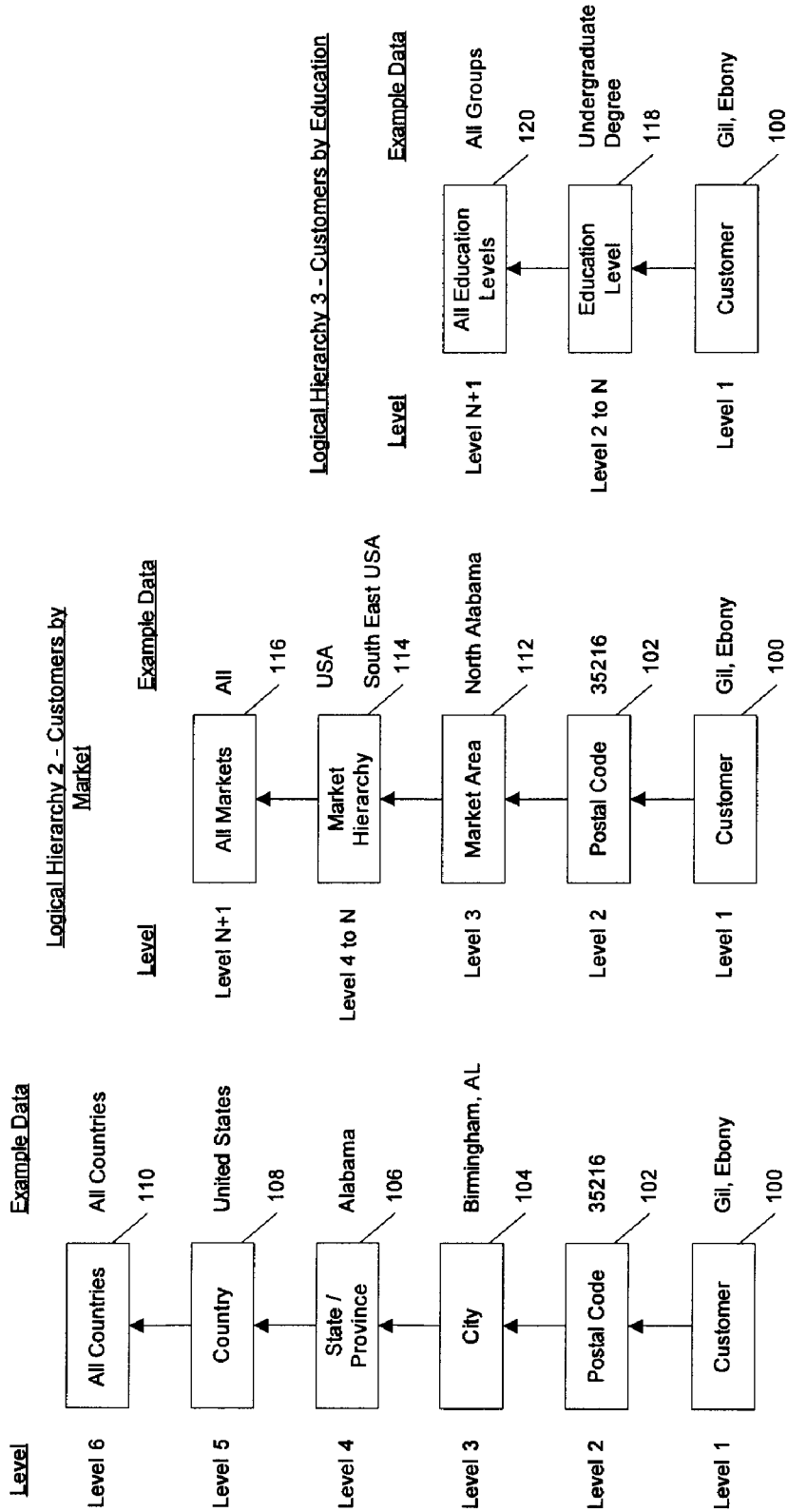
FIGS. 1A-1C illustrates three examples of related customer logical hierarchies based on alternative consolidation path relationships.

FIGS. 1A-1C show three examples of customer logical hierarchies based on alternative consolidation path relationships. In the example shown in FIG. 1A, Hierarchy 1 organizes customers 100 first by postal code 102, as each customer is assigned to a postal code. Each postal code 102 is assigned to one and only city 104. Each city 104 is assigned to one and only one state/province 106. Each state/province 106 is assigned to one and only one country 108, and finally all countries are added together into one total 110.

In the example shown in FIG. 1B, Hierarchy 2 organizes customers 100 first by postal code 102, as each customer is assigned to a postal code. Each postal code 102 is assigned to one and only market area 112. The market areas 112 are organized into a "ragged" market hierarchy 114 of varying depth, and ultimately all market areas are consolidated into a total: "All Markets" 116 which includes all market areas once and only once. In the example shown in FIG. 1C, Hierarchy 3 organizes customers 100 by education level 118. All education levels are added together into one total 120.

Figure 2:
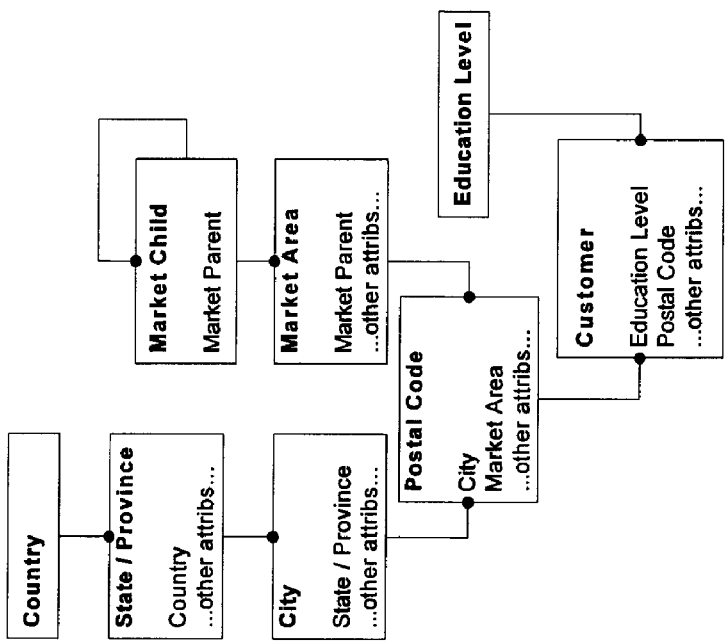
FIG. 2 illustrates dimensional data schema in third-normal form.

A relational database system, optimized for update transactions, storage and data integrity would represent the entities and relationships shown in FIGS. 1A-1C as a normalized schema as depicted in FIG. 2.

The schema could be physical or logical—a physical schema having separate tables per entity; a logical schema having multiple entities in shared tables with an entity field that separates entities into row sets.

Relationally structured data, as shown in FIG. 2, is often presented to users in computer-based forms for viewing and editing in tabular (multi-record) and form-based (single-record) formats.

Hierarchically structured data, such as the dimension definition files and tables, which are employed in reporting and analysis applications, is often optimized for display and editing without regard to the underlying entities and relationships that form the hierarchy. All members and parent-child relationships are treated equally for the purposes of editing.

Figure 3:
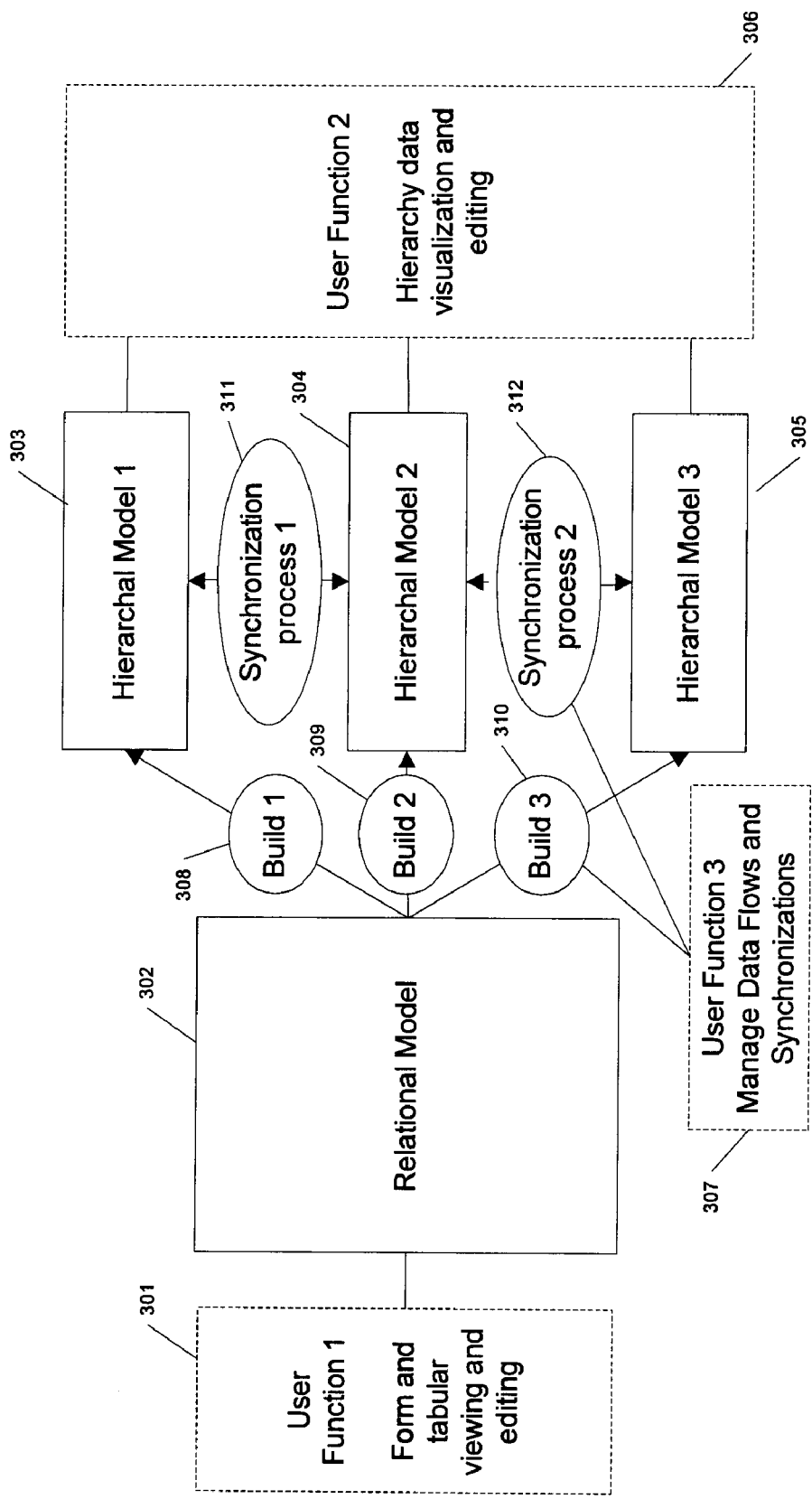
FIG. 3 illustrates integration of separate relational and hierarchal models.
Figure 4:
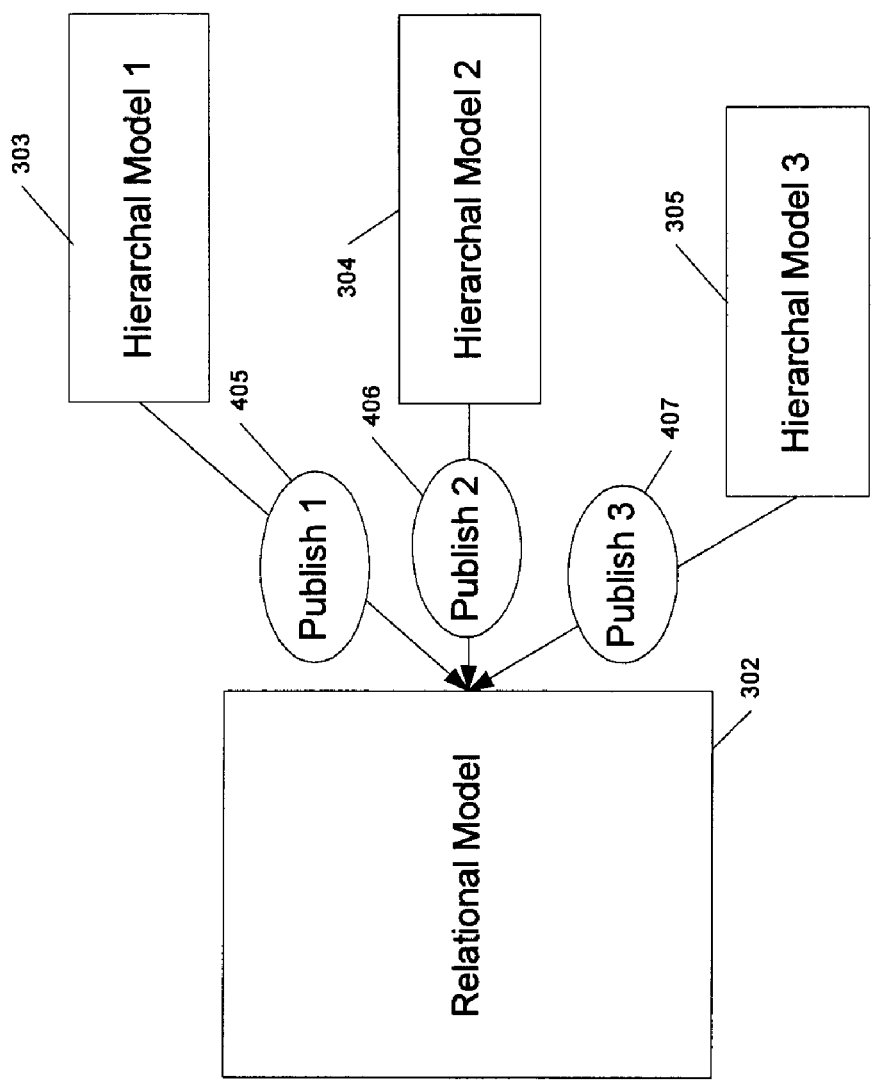
FIG. 4 illustrates updating of relational model from hierarchical models.

FIG. 3 shows the potential relationships between separate relational 302 and hierarchical models 303, 304, 305 where separate physical data stores contain duplicate information. The separate relational and hierarchical models can be integrated by Build processes 308, 309, 310 whereby Hierarchies 303, 304, 305 are updated from the relational model's data. Similarly, processes may be employed to publish data changes in one or more hierarchy models 303, 304, 305 to a relational model 302, as shown by Publish processes 405, 406, 407 in FIG. 4.

Form-based and tabular computer displays 301 are typically provided for viewing and editing of relational data models. Computer displays for hierarchy visualization and editing 306 are based on specialized hierarchical data models.

Frequently, multiple hierarchies, such as Hierarchal Models 303, 304, 305, are stored independently of one another, regardless of common shared structure. Some computer applications will provide process-based controls or updates (e.g., Synchronization processes 311, 312) to keep multiple models synchronized. The disadvantages to separate models for separate functions include the necessity of additional processes and user controls (e.g., Build processes 308, 309, 310; Synchronization processes 311, 312; Publish processes 405, 406, 407; and Manage Data Flow and Synchronization Function 307) to keep multiple data models synchronized with duplicate data as changes are made in one location. Furthermore, the features of security, relational integrity and real-time visibility provided by the Relational Model 302 are either not applied to the Hierarchal Models 303, 304, 305 or these features must be replicated to the Hierarchical Models. The Hierarchical Model does not inherently enforce the desired relationships among the levels of the hierarchy. For example, cities must be attached to the hierarchy directly below state/province members and can not be moved elsewhere.

Figure 5:
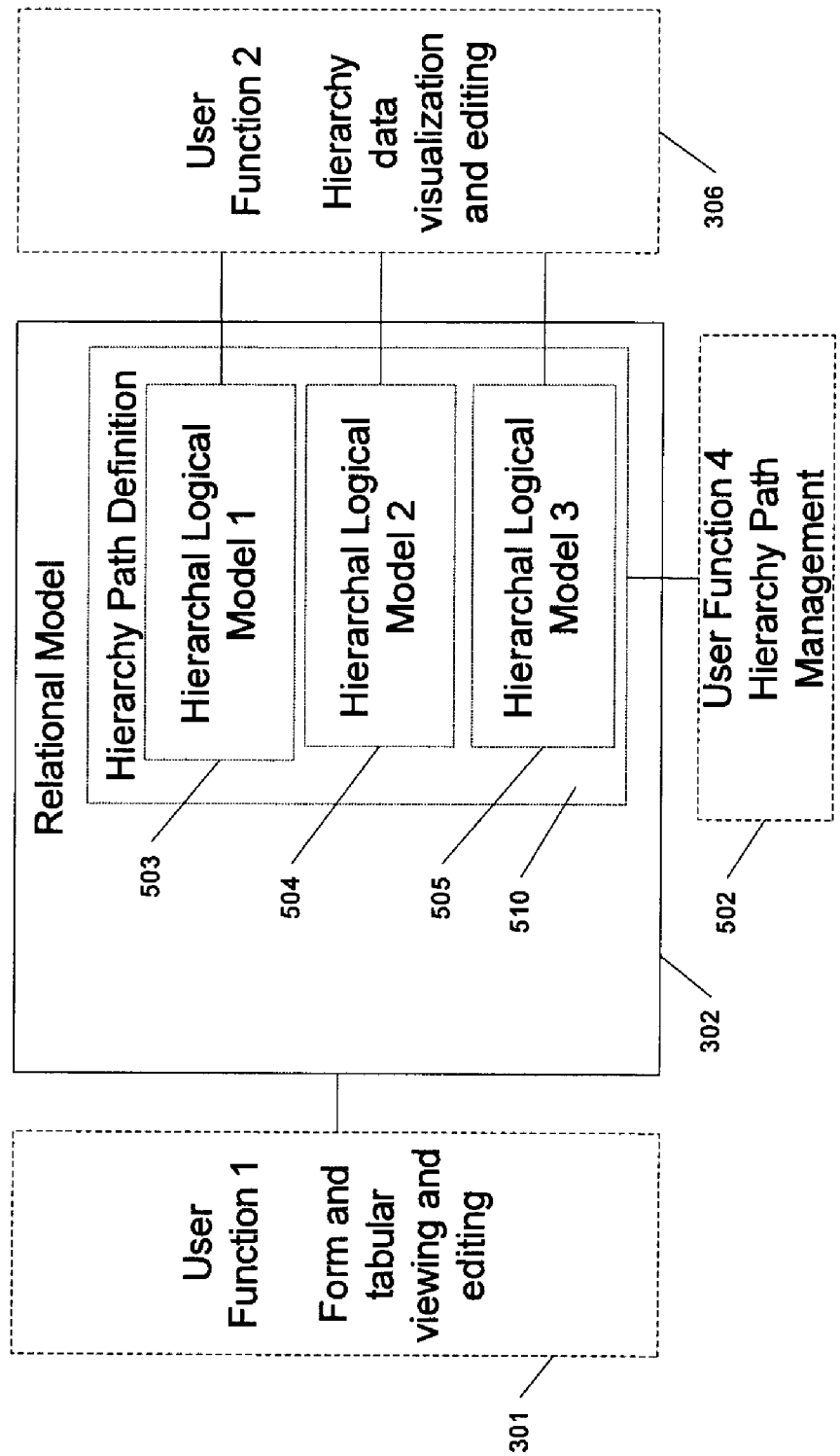
FIG. 5 illustrates an overview of the Derived Hierarchies of the invention with logical hierarchies implemented on a relational model.

FIG. 5 illustrates an overview of the invention in which logical hierarchies are implemented on a relational model. In the Hierarchical Models 503, 504, 505, data is directly read and not duplicated from the Relational Model 302. Hierarchy Path Management function 502 allows maintenance of a definition of the hierarchy paths that is imposed upon the underlying relational model 302. Hierarchy data visualization and editing functions 306 provides hierarchical visualization of the relational data and supports real-time edit transactions against that data through traditional hierarchy edit techniques, including dragging and dropping of members to new parent locations.

The Hierarchy Path Definitions 510 are additional information or "metadata" stored in the database that allows hierarchy data visualization functions 306 to render the specific hierarchies, interpreted from the underlying data. Data shared among hierarchies and between the hierarchies in the relational model 302 is stored once and referenced by all. For example, assigning a customer to another zip code in Hierarchy 1 (FIG. 1A) updates the customer to zip code relationship in Hierarchy 2 (FIG. 1B) as they are views of the same underlying information.

The physical models 303, 304, 305 in FIG. 3 become logical models 503, 504, 505 in FIG. 5, and therefore there is no duplication of data and no required building processes (FIG. 3) or publishing processes (FIG. 4), nor is there the associated latency of updates across multiple data stores. Additionally, the hierarchy display, represented by hierarchy data visualization function 306, can immediately re-read the underlying data to show the resulting hierarchy changes; no intermediate build process is required.

Security and integrity constraints applied to the Relational Model 302 are inherently adhered to in Hierarchical Logical Models 503, 504, 505.

The Hierarchy Path Definitions 510 can also serve as plans for automatically generating standard output views joining a plurality of relational model tables to simplify the integration of external systems with the Relational Model 302.

Having introduced the concept of a Hierarchical Logical Model 503, 504, 505 which is not physically stored but derived from a Hierarchy Path Definition 510 and underlying data in a Relational Model 302, the term "Derived Hierarchy" is introduced to refer to a logical or virtual hierarchy enabled by the invention, consisting of its definition, presentation, data, etc.

Before describing additional aspects of the invention, it will be helpful to provide and describe an example data model which can be used to illustrate exemplary embodiments of the invention.

The example data model shown in FIG. 6 is for customer information. This model includes a customer entity 601 or list of customers. Each customer can have any number of free-form and domain-based attributes. Domain-based attributes are foreign-key references to member records of other entities. In the example data model, domain-based attributes for customer include: education, occupation, marital status, gender and postal code. Postal code has a domain-based attribute city. City has a domain-based attribute state. State has an arbitrary hierarchy imposed named "area" including any number of state consolidations arranged in any number of levels. The highest-level consolidations of the area hierarchy have a domain-based attribute country-region. These example entities and relationships are the basis of an example Derived Hierarchy named "Geography" which will consolidate customers into postal codes into cities into states into areas into countries/regions.

The example data model described represents just one of many possible types of data models. The present invention applies to any and all conceived data sets that support hierarchies including, but not limited to, data related to products, chart-of-accounts, locations, vendors, suppliers, etc.

The invention operates within the context of a data management application with a customizable data model. In an exemplary embodiment, the data model shown in FIG. 6 corresponds to a physical database schema. Each conceptual entity, such as customer 601 or education 602, is represented by a table. Each member within an entity list, such as customer "Lewis, Ian" (603), is stored as a record. The relationships between entities are stored as foreign key fields, such as the education field 604 associated with each customer. The schema presented is a third-normal form as known to those skilled in the art.

An exemplary embodiment includes a schema of control tables, as illustrated in FIG. 7, that maintain data about the structure of the underlying data model or "metadata". Reference to table names (e.g., "EntityTable" column of the Entity Table 701) and column names (e.g., "Name" column of the Attribute Table 702) allow dynamic SQL against a customized data model and schema to both retrieve data for display in a hierarchy and update underlying data in the model based on edit actions in the hierarchy display.

In an exemplary embodiment, the Derived Hierarchy is specified with respect to a defined data model. Within the example customer data model there are several entities, entity relationships and explicit hierarchies already defined that will serve as the component parts of the Derived Hierarchy and therefore provide selections and options for the Derived Hierarchy to be created. Additional entities, relationships and hierarchies may be created as needed to support the desired Derived Hierarchies.

In an exemplary embodiment, zero to unlimited numbers of Derived Hierarchies can be created and maintained for each data model. When no longer useful, Derived Hierarchy definitions can be deleted while preserving the underlying data that was visualized and updated by the Derived Hierarchy.

The exemplary embodiment provides the creation of new Derived Hierarchies and editing of existing Derived Hierarchies via a simple user interface. This enables non-technical application users to implement new Derived Hierarchies or maintain existing Derived Hierarchies.

Figure 8:
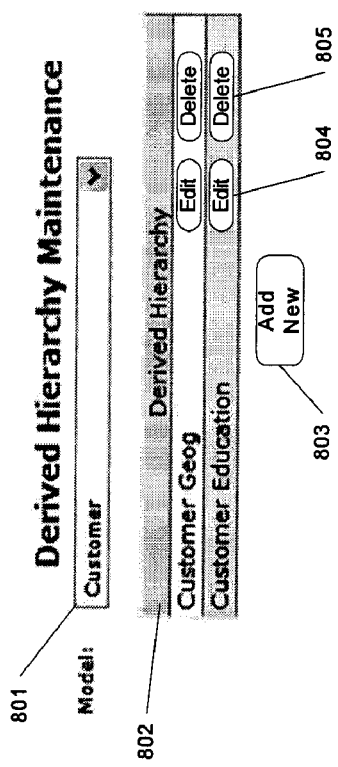
FIG. 8 illustrates an exemplary Derived Hierarchy maintenance screen.

A Derived Hierarchy is created or maintained by users via a maintenance screen such as the screen depicted in FIG. 8. In the exemplary embodiment, multiple specialized models may exist where the user must choose the model 801. In an alternate embodiment, the data model is one unit. Existing Derived Hierarchies 802 are displayed as retrieved from the Metadata model 704 (FIG. 7). User actions include editing 804 or deleting 805 of existing Derived Hierarchies or creation 803 of new Derived Hierarchies.

Figure 9:
FIG. 9 illustrates an initial creation and naming of the Derived Hierarchy in an exemplary embodiment.

Creating a new Derived Hierarchy entails naming of the new item 901 as shown in FIG. 9.

Starting from an empty definition, the Derived Hierarchy should be captured to sufficiently populate the definition schema 705 (FIG. 7) with a selection of related entities and explicit hierarchies in level-order. The user may define the levels from top to bottom or bottom to top. The exemplary embodiment uses a top to bottom approach where "level 1" will represent the top or most summary level of the Derived Hierarchy.

After each level selection is made, the choices for the next level are restricted based on the data model. Any entity or hierarchy may be chosen for level 1. Level 2, directly below level 1, may only include those entities that have an attribute relationship to the entity in level 1. Level 3, directly below level 2, may only include those entities that have an attribute relationship to the entity in level 2, etc. For example, if "state" is selected as level 1 and only the "city" and "market" entities have a "state" attribute, then either "city" or "state" must be selected for level 2.

Figure 10:
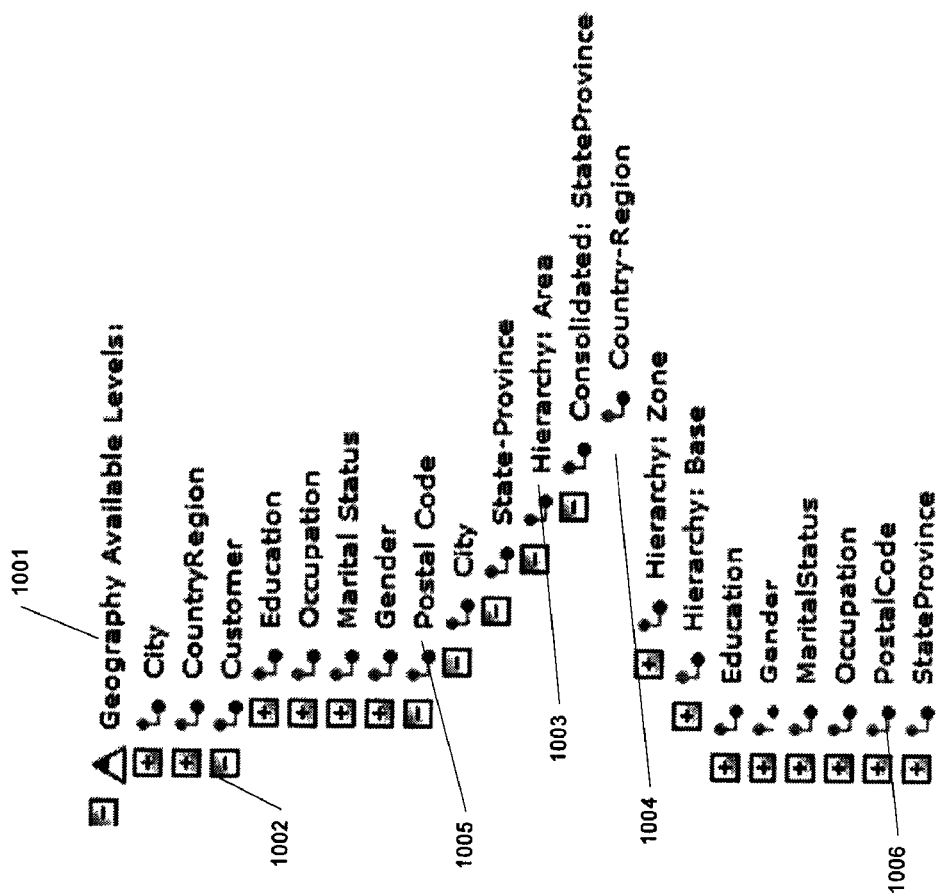
FIG. 10 illustrates a palette of available entities and hierarchies for use in the definition of a Derived Hierarchy.

A variety of user interface implementations can capture the list of levels and options for definition of the Derived Hierarchy. A palette of available levels of entities and hierarchies ("Available Levels"), as illustrated in FIG. 10, is provided to the user for selection. The user may drag an item from the Available Levels to the current hierarchy definition ("Current Levels"), as illustrated in FIG. 11, to add new levels.

The user may expand an entity to see related entities or hierarchies within the Available Levels. With reference to FIG. 10, "Customer" 1002 can be expanded by the user to reveal entities related by attribute, such as "Education", "Occupation", etc. In the exemplary embodiment, additional intelligence and usability is provided by allowing the user to expand the entity-attribute relationships. Selecting "Postal Code" 1005 below "Customer" 1002 implies that both "Postal Code" 1005 and "Customer" 1002 are being selected in one user action with "Postal Code" 1005 as the first level and "Customer" 1002 as the second level.

The Available Levels will be restricted based on the context of the Current Levels in the Derived Hierarchy. For example, if "State" is already selected as the lowest level, only those entities and hierarchies that have a "State" attribute relationship will be displayed as possible choices for an additional level below "State".

Figure 11:
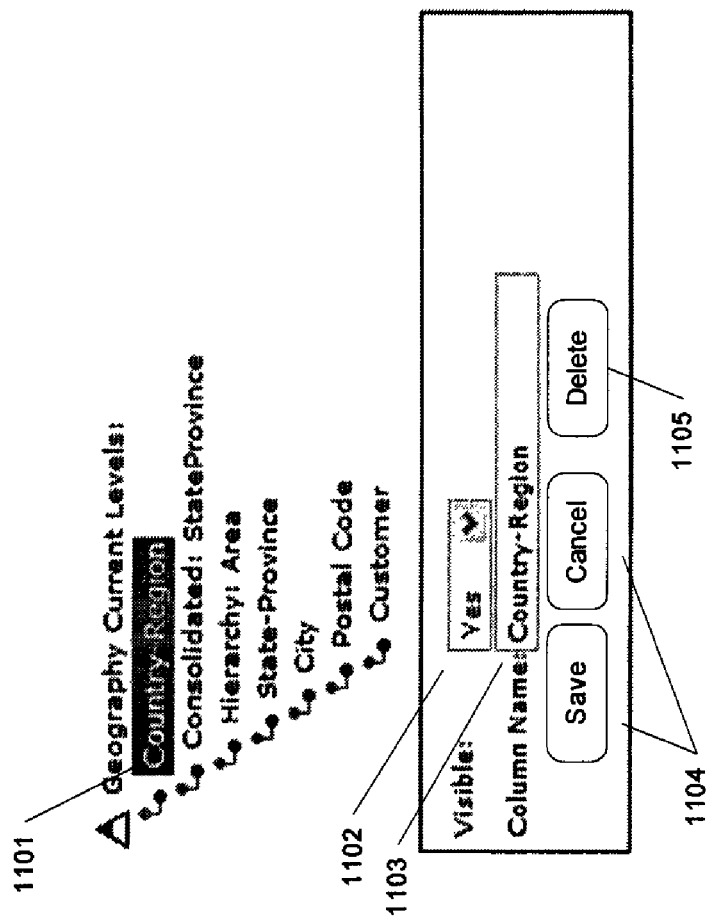
FIG. 11 illustrates a display of levels forming a Derived Hierarchy with edit capability.

FIG. 11 represents a hierarchically indented display of the Current Levels in the Derived Hierarchy definition. This is a user interface to display and maintain the data in the Derived Hierarchy Detail table 705 (FIG. 7). This exemplary embodiment provides a visual cue to the user showing the top-down arrangement of the levels of the Derived Hierarchy. With reference to FIG. 11, the user may select a level 1101 and edit the options 1102, 1103 associated with the level or delete 1105 the level entirely if it is at the very top or bottom of the Derived Hierarchy. The user may elect to hide or make invisible 1102 certain levels of the hierarchy so that they are not displayed when viewing the underlying data as the Derived Hierarchy.

Figure 12:
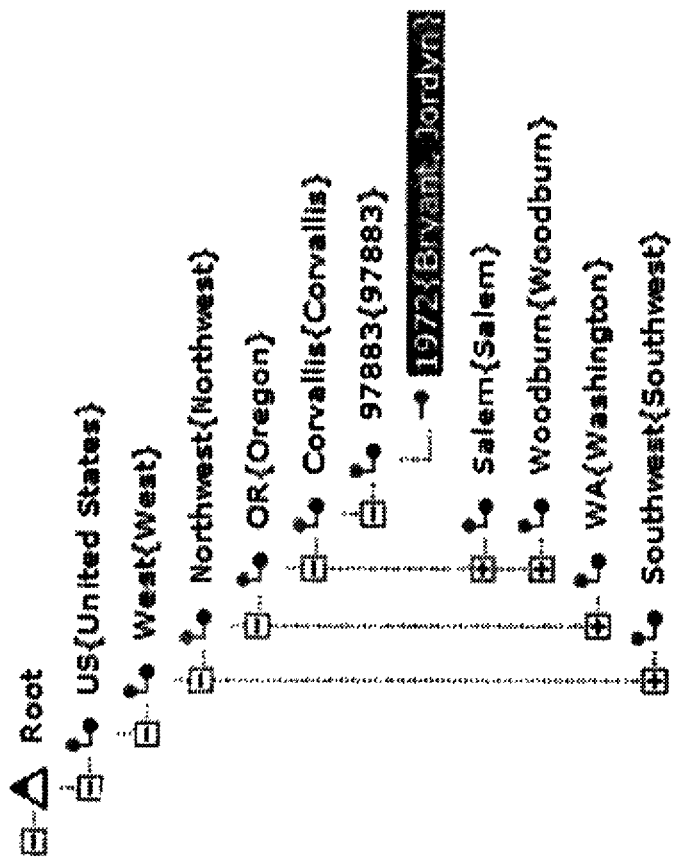
FIG. 12 illustrates a preview of a Derived Hierarchy showing the application of the hierarchy definition upon the underlying data in the model.

Although not necessary to implement the functionality, in the exemplary embodiment described, the user interface for definition of the Derived Hierarchy will offer instant feedback, displaying a preview of the Derived Hierarchy applied to the data as illustrated in FIG. 12. The preview should allow navigation: expansion and contraction of the hierarchy. The author of the Derived Hierarchy is assured of the results of his definition by the preview pane.

Figure 13:
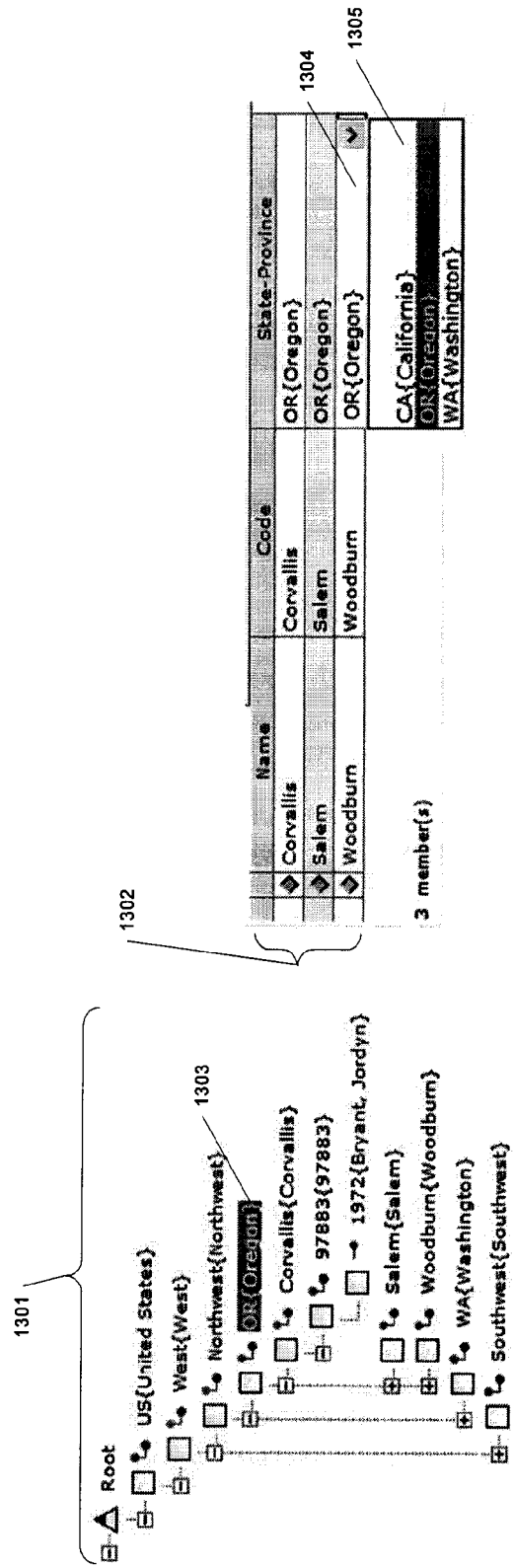
FIG. 13 illustrates a display of the Derived Hierarchy with integrated data grid.

Once a Derived Hierarchy is defined, the invention renders the hierarchy display illustrated in FIG. 13 to users for hierarchical visualization of the data members and their relationships to one another. Users are presented with menus of available Derived Hierarchies which they may select for viewing.

Using the stored definition, the data records are retrieved from dynamically generated views in the exemplary embodiment, or by dynamic SQL in an alternate embodiment. The generated views or dynamic SQL described in greater detail below, link multiple related tables in the data model. The combined data set is displayed by a hierarchy grid object 1301. Any number of commercially available hierarchy grid objects in modern software development environments may be used to achieve the display effect.

In the exemplary embodiment, both the business key and the descriptive name of each member are displayed in the hierarchy. In alternate embodiments, only the key or name is displayed, or there is a choice of one or the other. The hierarchy display supports common hierarchy navigation methods such as "expanding" or "drilling-down" on a member, "collapsing" a member, and searching for members by all or part of the business key or descriptive name.

In the exemplary embodiment shown in FIG. 13, a tabular grid 1302 of member data is presented alongside or as a link from the hierarchy display 1301. The benefit is navigation and selection of members by hierarchy along with display of any and all attributes associated with the found members, regardless of whether those attributes are data values driving the Derived Hierarchy. In an alternate embodiment, the hierarchical display is presented without a linked data grid.

In the example illustrated, "Oregon" 1303 is a state selected in the hierarchy. Based on this selection, the grid 1302 can show the immediate child members of the next level, which are the cities: "Corvallis", "Salem", and "Woodburn". Preferably, a drop-down list of descendant levels (in this case Cities, Postal Codes and Customers) can be displayed for the user's selection. Based on this selection, the appropriate list of members from the selected entity is returned with its respective attribute columns and filtered by the selection in the hierarchy.

The invention includes a number of data editing methods that leverage the hierarchical display to change the underlying data in the model. One benefit of the invention is transactional update of the data directly in the optimized relational data model, preferably using SQL transaction control and stored procedures. The user interface, in conjunction with the data model, ensures enforcement of the appropriate data relationships as the data is updated.

Figure 14:
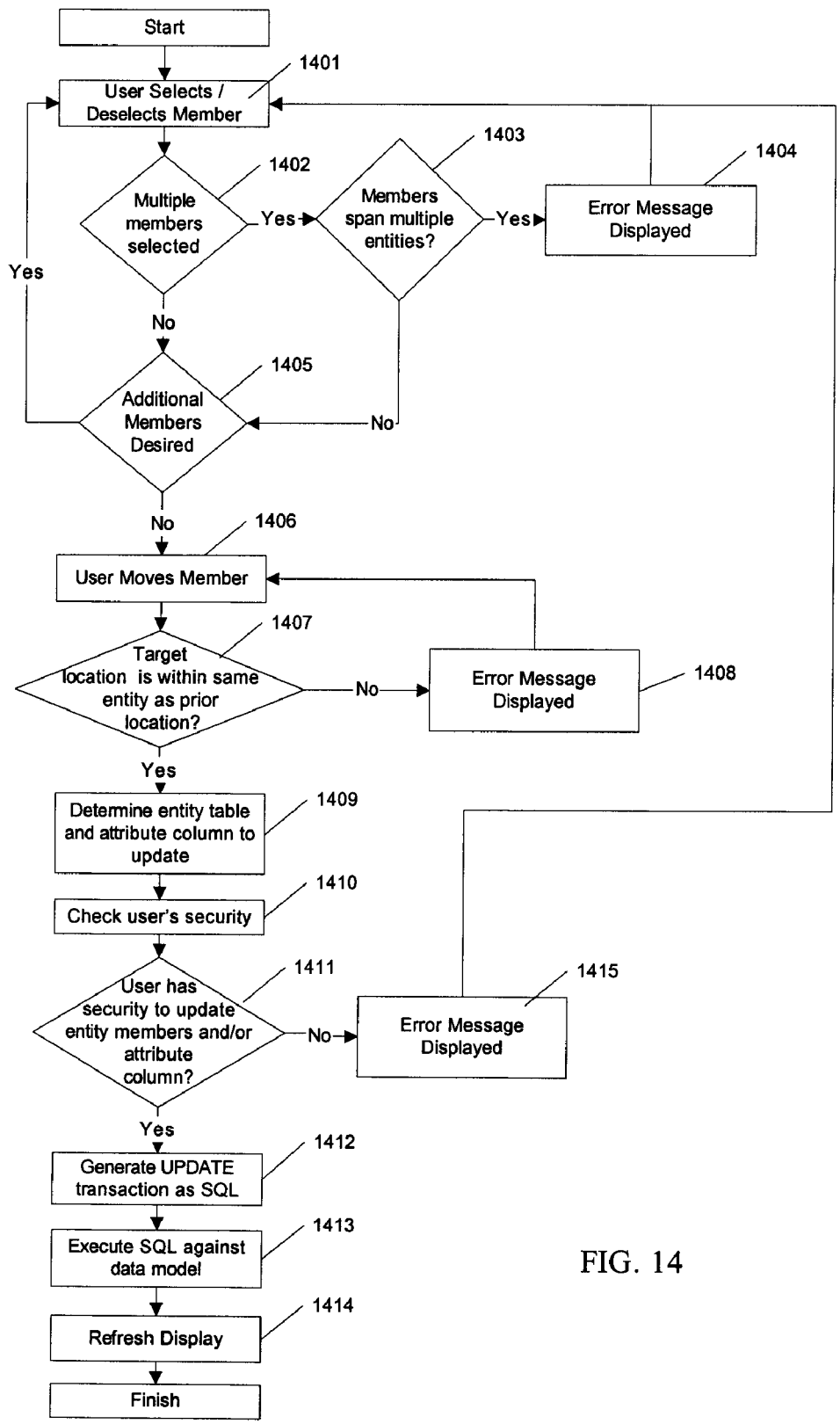
FIG. 14 illustrates processing logic for the data update process in an exemplary embodiment of the invention.

FIG. 14 depicts exemplary processing logic for the data update process which translates user action in the hierarchy display into update transactions in a relational database. Some operations may be varied or omitted while still achieving the desired functions of the invention.

Figure 15:
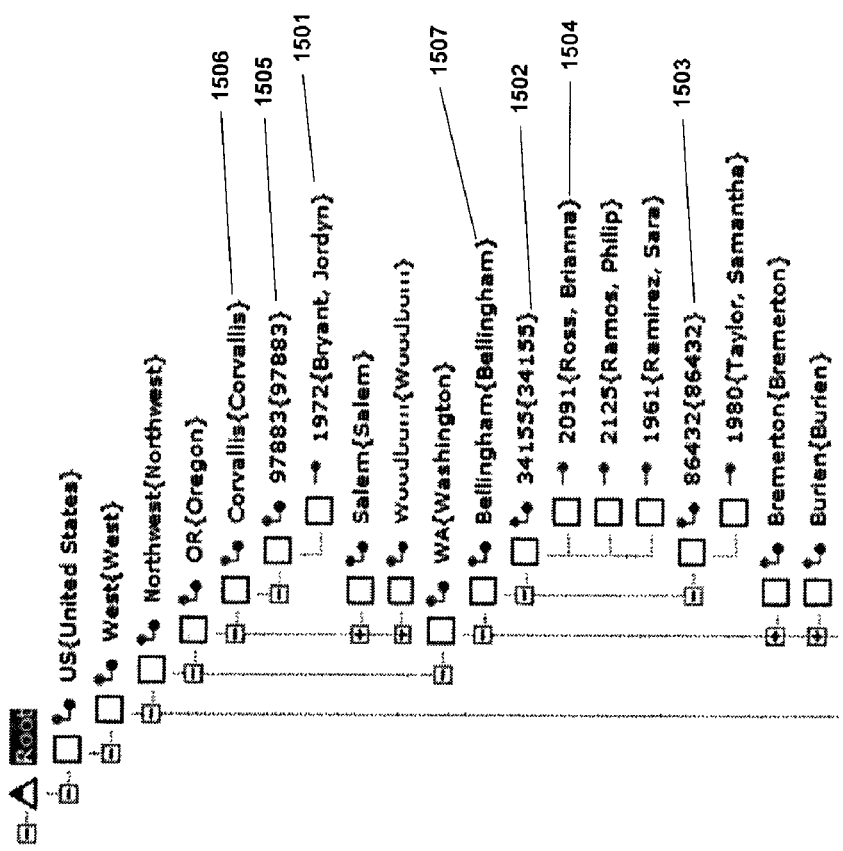
FIG. 15 illustrates a sample Derived Hierarchy display for explanation of edit capabilities.

Using the hierarchy display, drag-and-drop or cut-and-paste edit paradigms, as common to modern software applications, are employed for user edits of data. With reference to FIG. 15, the customer 1972 (ref. 1501) can be selected by a mouse click and moved from postal code 97883 (ref. 1505) to any other postal code such as 34155 (ref. 1502) or 86432 (ref. 1503). This action represents a valid data change as each customer is directly related to a postal code by an attribute column in the customer entity table. By capturing the physical table and column locations of data in the model via the metadata model of FIG. 7, the invention can formulate the procedure call or SQL (FIG. 14, blocks 1409, 1412) to update the postal code foreign key column in the customer entity table to execute the change requested by the example user action (FIG. 14, block 1413).

As a variation of the above update method, multiple members within the same entity can be selected for update (FIG. 14, block 1405). For example, two or more customers, such as 1972 (ref. 1501) and 2091 (ref. 1504) can be selected using check-boxes, control-click or shift-click multi-selection paradigms, as common to modern software programs, and moved to a new postal code, such as 86432 (ref. 1503).

Expanding the above update method examples, edits may be applied appropriately through all levels of the Derived Hierarchy. For example, a postal code, such as 97883 (ref. 1505) can be moved to a new city, such as Bellingham (ref. 1507).

A significant advantage of the invention is sharing of common data across multiple display formats, including multiple Derived Hierarchies. When an underlying data change is made outside of the hierarchy display, the hierarchy display may be refreshed to reflect the change immediately. For example, a user clicks in a data grid 1304 (FIG. 13) to assign a new attribute value from the domain of possible choices. For example, "California" 1305 is selected in place of "Oregon." After this attribute update, the Derived Hierarchy display (FIG. 13, ref. 1301) can be refreshed manually or automatically to show the resulting hierarchy structure with "Woodburn" below "California." Furthermore, additional Derived Hierarchies may be defined that also use the City-to-State relationship but vary from the Geography hierarchy on other levels. All hierarchies sharing the common data and relationships would be updated as well without duplicate maintenance.

In an exemplary embodiment, the invention can prevent erroneous edits of the Derived Hierarchy data based on the information maintained about the underlying data model and preferably, errors are prevented in a proactive rather than reactive fashion by the user interface.

Recognizing the type of entity and level of the member or members selected, the invention will prevent users from moving members to a new location where the entity does not match that of the prior location (FIG. 14, block 1407).

The invention will prevent members of different entities from being selected for a single move operation (FIG. 14, block 1403).

By relying on a common underlying data model, the user interface or update procedure can defer to a user security model imposed on the data model components whereby a user is restricted to updating selected entities, members within entities or attribute columns. As shown in the data update processing logic (FIG. 14, blocks 1410, 1411), a common security model is accessed and checked. This provides advantages of granular security within a large hierarchy as well as shared security by data model component, rather than implementing security across multiple hierarchies independently.

Figure 16:
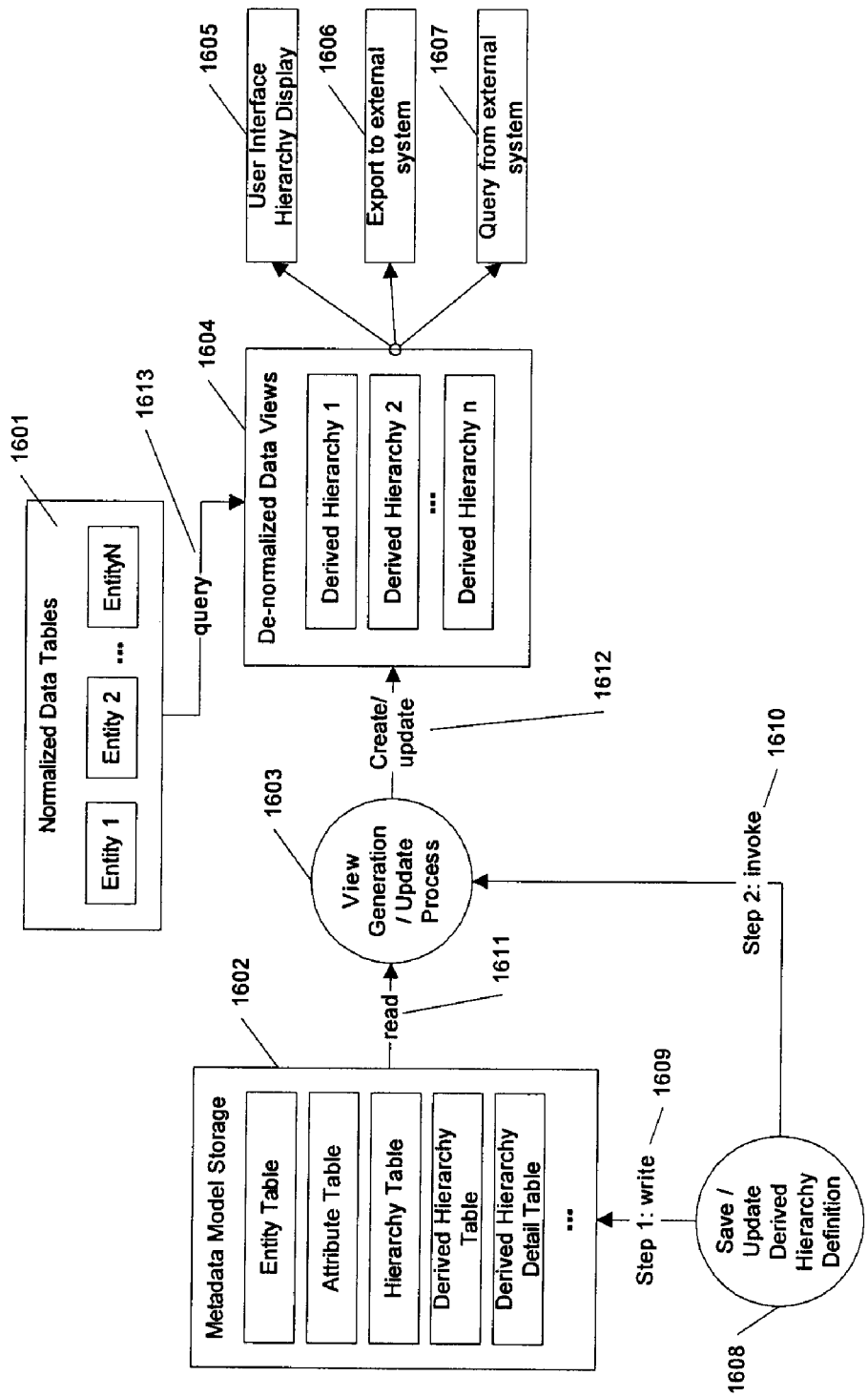
FIG. 16 illustrates an SQL view generation for defined Derived Hierarchies.

As illustrated in FIG. 16, another aspect of the invention is an automated SQL generation capability 1603 to intelligently create composite, de-normalized views 1604 of the Derived Hierarchy's data stored in normalized data tables 1601 using the Derived Hierarchy definitions stored in the previously described Metadata Model 1602. The de-normalized views support the display of the hierarchies 1605 using commonly available hierarchy display objects for computer system user interfaces as well as simplified data integration and exports for external systems 1606, 1607.

Figures 17A, 17B:
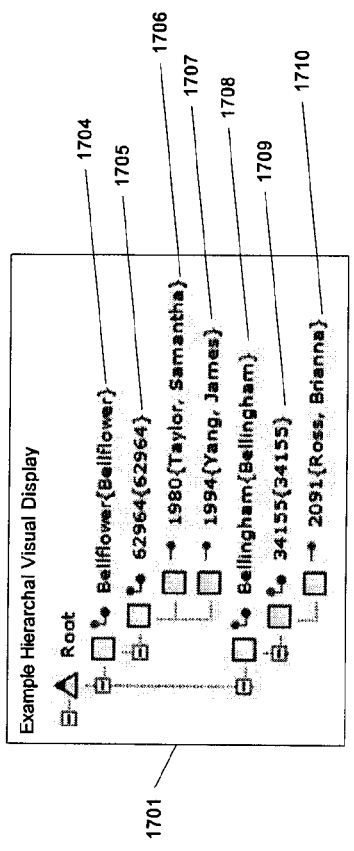

To provide clarity and contrast to the view, storage and display formats envisaged in FIG. 16, an example of hierarchical data is shown in alternative formats in FIGS. 17A-17C. In FIG. 17A, an example visual hierarchy display 1701 of example customer data is presented. As is common to many commercially available software applications, hierarchies are visually presented using various combinations of relative indentation and/or connecting lines and/or graphic icons. In this example, customers 1706, 1707, 1710 are each assigned to a postal code 1705, 1709 and each postal code is assigned to a city 1704, 1708. For the data presented by the hierarchy, optimal relational database storage, in a non-generic schema, fit to the example data model 1702, would involve multiple, related tables 1711, 1712, 1713 in third-normal form as shown in FIG. 17B. Two alternative tabular view formats 1703 of the Derived Hierarchy's data are presented in FIG. 17C: one in parent-child arrangement 1714, the other in level arrangement 1715. The general arrangement of both view formats, allowing for variations in columns, naming, ordering and other specific formats, are common to many existing software applications and are known implementations to those skilled in the art.

The invention provides the novel and beneficial approach of automatically generating SQL to provide a composite view of new or modified Derived Hierarchies from data stored in a normalized schema. This occurs as non-technical users modify the Derived Hierarchy definition via the user interface, rather than requiring database analysts or programmers to develop the SQL. The invention thereby avoids the alternative need for generic or de-normalized schemas for storage of data or duplication of data from normalized storage into said storage formats. By avoiding duplication of storage, a suitable hierarchy editing environment is enabled where the display can re-read the underlying data to quickly reflect the changes made.

In one embodiment, the "de-normalized views" are implemented as SQL view objects, created in a relational database. Alternate embodiments implement storage of the constructed SQL syntax or dynamically generate the SQL syntax for use when needed to read or retrieve a tabular view of the Derived Hierarchy's data.

Figure 18:
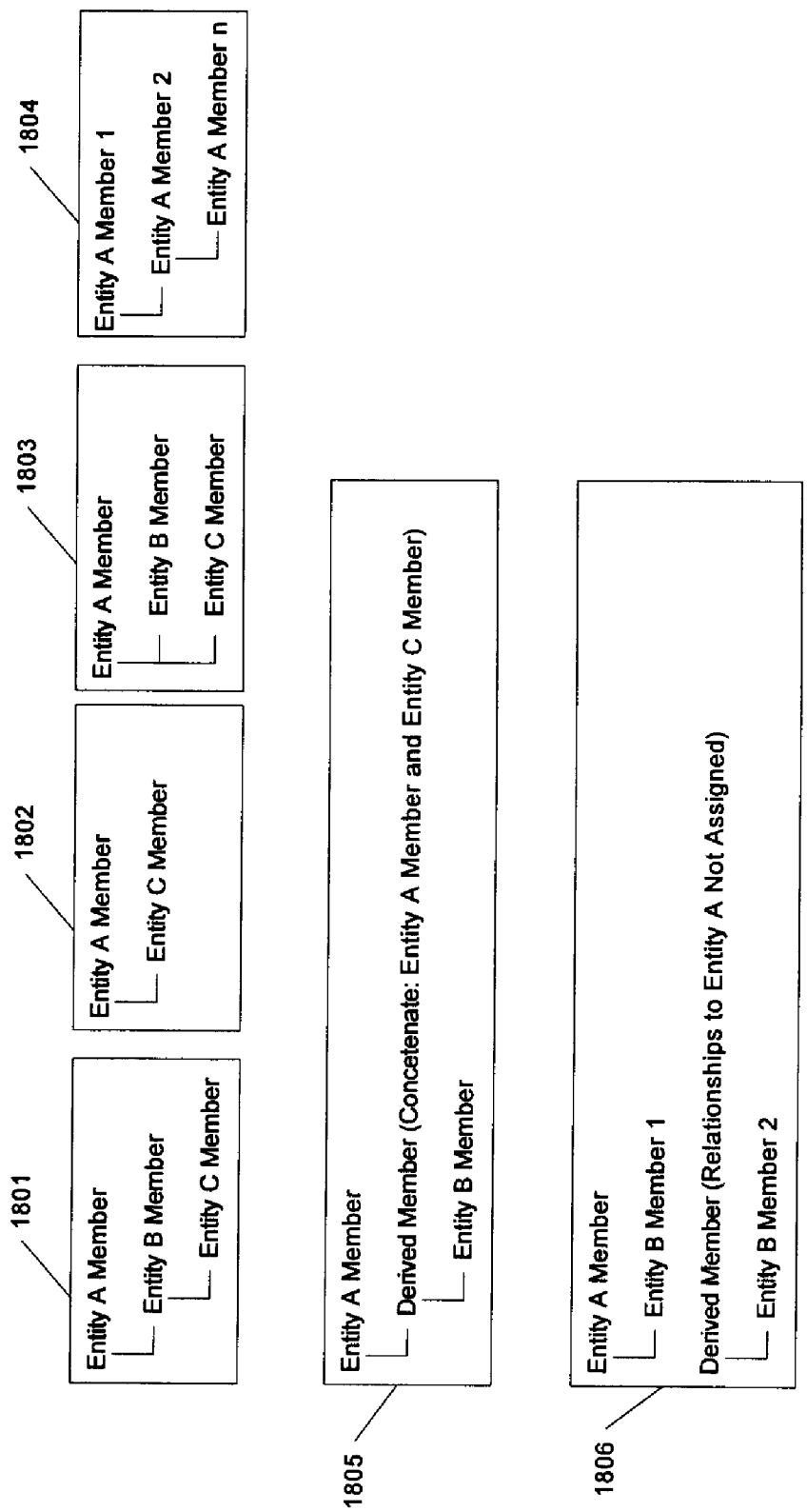
FIG. 18 illustrates exemplary variants of Derived Hierarchy definitions.

The exemplary embodiment of Derived Hierarchy definitions flexibly supports many possible variations of hierarchical structures from various relational data models as illustrated in FIG. 18.

In a simple hierarchy 1801, each Entity C member is related to one and only one Entity B member and each Entity B member is related to one and only one Entity A member. Thus a hierarchical presentation or data view can be formed with Entity A members at the top level, Entity B members below Entity A members and Entity C members below Entity B members. This example can be extended with any number of related entities forming any number of levels in a hierarchy.

In a variation 1802 of hierarchy view 1801, the second level (the position of Entity B members) has been designated as hidden. The hidden/visible designation is stored in a column of the Derived Hierarchy Detail table 705 (FIG. 7). Thus, the same data relationships exist as for the first example (hierarchy 1801); however, the variation in Derived Hierarchy definition produces an alternative result.

Hierarchy view 1803 shows the possibility of branched levels where two entities, i.e., Entities B and C are applied to the same level below Entity A. In this case, the data model is such that each Entity B member and each Entity C member is related to an Entity A member. An embodiment of this definition is achieved in the Derived Hierarchy Detail table 705 (FIG. 7) where Entities A and B are designated with the same level number.

Hierarchy view 1804 shows the possibility of a recursive relationship where Entity A is related to itself. A common example of this situation is an employee table that includes a manager relationship column where the manager column links to another employee record within the same table. Thus, in hierarchy 1804, Member n's manager is Member 2 and Member 2's manager is Member 1. An embodiment of this definition is achieved in the Derived Hierarchy Detail table 705 (FIG. 7) by referring to the same entity on multiple levels or by designating a level as recursive in an additional column and storing or restricting the maximum number of levels.

Hierarchy view 1805 shows a derived member in a derived level of the hierarchy where the derived members serve as sub-groupings. In this example, each Entity B member is related to one Entity A member as well as one Entity C member. Each Entity B member is displayed below a derived member representing the concatenation of the assigned Entity A and Entity C members. One embodiment of the definition includes a sub-grouping entity stored in an additional column of the Derived Hierarchy Detail table 705 (FIG. 7). In this example, the sub-grouping entity is associated with the Entity B level record.

Hierarchy view 1806 considers an Entity B related to Entity A where not all Entity B members have been assigned to Entity A members. As an option to the Derived Hierarchy definition, the hierarchy view may substitute a designated replacement member, such as "unassigned" in the case of a null or missing Entity A assignment for an Entity B member. In so doing, all Entity B members are included within the hierarchy. An embodiment of this feature includes fields in the Derived Hierarchy Detail table 705 (FIG. 7) for the "include unassigned" setting and substitute member name. As a converse of this feature, a false "include unassigned" setting, coupled with unassigned members, serves to intentionally exclude members from a hierarchy.

The above examples illustrate many potential Derived Hierarchy definition and rendering techniques which can be combined together in any combinations and with any number of levels to form a Derived Hierarchy definition.

The system and method for Derived Hierarchies for definition, visualization and editing of data have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed is:

1. A method for creating derived hierarchies for visualization and editing of data stored in a relational database, comprising:
   accessing a relational data model that is stored within the relational database;
   determining a plurality of data entities and relationships of the relational data model;
   maintaining a plurality of information on a structure of the relational database within a schema of control tables in the relational database;
   using same graphical user interface, interactively defining the derived hierarchies to impose on the relational data model stored in the relational database, wherein each of the defined derived hierarchies comprises levels that are interactively defined in either one of: a top to bottom manner and a bottom to to manner using the graphical user interface and wherein after an entity for each level is defined, displaying and restricting in the graphical user interface, choices for entities at a next level based on an attribute relationship of the data entities of the relational data model with the defined entity for each level;
   storing definition information for the defined derived hierarchies within the schema of control tables, wherein each of the defined derived hierarchies is usable to present a different hierarchical visualization of data of the relational data model stored in the relational database without duplication of data of the relational data model that is shared between multiple ones of the defined derived hierarchies;
   presenting one of the hierarchical visualizations of data of the relational data model stored in the relational database on a user interface display using any one of the defined derived hierarchies; and
   automatically editing data of the relational data model stored in the relational database by editing of the hierarchical visualization of data presented on the user interface display.

2. The method for creating derived hierarchies of claim 1 wherein the editing of the hierarchical visualization of data is performed using any one of a drag and drop, a copy and paste, and a cut and paste editing function to move a member in one of the derived hierarchies to a different location in the hierarchy.

3. The method for creating the derived hierarchies of claim 1 wherein the defined hierarchies comprise metadata stored in the relational database that enables hierarchy data visualization to render a specific hierarchy that is interpreted from an underlying data stored in the relational database.

4. The method for creating the derived hierarchies of claim 1 wherein the data stored in the relational database is shared and referenced by each derived hierarchy.

5. The method for creating the derived hierarchies of claim 1 wherein editing one of the derived hierarchies enables an underlying data to display a resulting change in the derived hierarchy immediately.

6. The method for creating the derived hierarchies of claim 1 wherein each security and integrity constraint applied to the relational database is applied to each derived hierarchy.

7. The method for creating the derived hierarchies of claim 1 wherein each derived hierarchy relies solely on an underlying data stored in the relational database and does not store the underlying data in a separate database conforming to the hierarchical structure of the derived hierarchy.

8. The method for creating the derived hierarchies of claim 1 wherein the schema of control tables comprises an entity table having a plurality of fields including an identifier used as a primary key, and at least one of an associated data model, an entity name, an entity table name, a hierarchy relationship table name, and a hierarchy parent table name.

9. The method for creating the derived hierarchies of claim 1 wherein the schema of control tables comprises an attribute table having a plurality of fields including an identifier used as a primary key, and at least one of an associated entity, a domain of the associated entity, a type of attribute, a member type, a name of a foreign key column for the attribute, a display name of the attribute column and a data type of the attribute.

10. The method for creating the derived hierarchies of claim 1 wherein the schema of control tables comprises a hierarchy table having a plurality of fields including an identifier used as a primary key, and at least one of an associated entity, a hierarchy name and a mandatory identifier that indicates a forced participation of a plurality of members in a hierarchy.

11. The method for creating the derived hierarchies of claim 1 wherein the schema of control tables comprises a derived hierarchy table having a plurality of fields including an identifier used as a primary key, and at least one of a derived hierarchy name, and a data model associated with a derived hierarchy.

12. The method for creating the derived hierarchies of claim 1 wherein the schema of control tables comprises a derived hierarchy detail table having a plurality of fields including an identifier used as a primary key, and at least one of a master derived hierarchy record, a level number of the derived hierarchy, an associated entity, an associated attribute, a display name of the level, and a visible indicator for the level.

13. The method for creating the derived hierarchies of claim 12 wherein the visible indicator comprises a value that indicates whether a specific level of a derived hierarchy is to be displayed.

14. The method for creating the derived hierarchies of claim 1 wherein the step of interactively defining the hierarchies comprises displaying a list of available levels of entities and hierarchies for user selection.

15. The method for creating the derived hierarchies of claim 14 further comprising displaying a current hierarchy definition to the user.

16. The method for creating the derived hierarchies of claim 15 further comprising adding a new level to the current hierarchy definition display by dragging an available level from the list of available levels and dropping the available level in the current hierarchy definition display.

17. The method for creating the derived hierarchies of claim 16 further comprising displaying a preview of the hierarchy applied to the underlying data in the relational database.

18. The method for creating the derived hierarchies of claim 17 wherein the displayed preview of the derived hierarchy enables expansion and contraction of the derived hierarchy.

19. A system for creating derived hierarchies for visualization and editing of data stored in a relational database, comprising:
   a data store for storing the relational database;
   a processor executing a plurality of components including:
      a component for determining a plurality of data entities and relationships of a relational data model stored in the relational database;

a component for maintaining a plurality of information on the structure of the relational database within a schema of control tables in the relational database;

a component for interactively defining the derived hierarchies to impose on the relational data model stored in the relational database using same graphical user interface, wherein each of the defined derived hierarchies comprises levels that are interactively defined in either one of: a top to bottom manner and a bottom to top manner using the graphical user interface and wherein after an entity for each level is defined, displaying and restricting in the graphical user interface, choices for entities at a next level based on an attribute relationship of the data entities of the relational data model with the defined entity for each level;

a component for storing definition information for the defined derived hierarchies within the schema of control tables, wherein each of the defined derived hierarchies is usable to present a different hierarchical visualization of data of the relational data model stored in the relational database without duplication of data of the relational data model that is shared between multiple ones of the defined derived hierarchies;

a component for presenting one of the hierarchical visualizations of data of the relational data model stored in the relational database on a user interface display using any one of the defined derived hierarchies; and a component for automatically editing data of the relational data model stored in the relational database by editing of the hierarchical visualization of data presented on the user interface display.

20. The system for creating the derived hierarchies of claim 19 wherein the component for the editing of the hierarchical visualization of data enables at least one of a drag and drop, a copy and paste, and a cut and paste editing function to move a member in one of the derived hierarchies to a different location in the hierarchy.

21. The system for creating the derived hierarchies of claim 19 wherein the component for defining the hierarchies comprises metadata stored in the relational database that enables hierarchy data visualization to render a specific hierarchy that is interpreted from an underlying data stored in the relational database.

22. The system for creating the derived hierarchies of claim 19 wherein the data stored in the relational database is shared and referenced by each derived hierarchy.

23. The system for creating the derived hierarchies of claim 19 wherein a component for editing one of the derived hierarchies enables an underlying data to display a resulting change in the derived hierarchy immediately.

24. The system for creating the derived hierarchies of claim 19 wherein each security and integrity constraint applied to the relational database is applied to each derived hierarchy.

25. The system for creating the derived hierarchies of claim 19 wherein each derived hierarchy relies solely on an underlying data stored in the relational database and does not store the underlying data in a separate database conforming to the hierarchical structure of the derived hierarchy.

26. The system for creating the derived hierarchies of claim 19 wherein the schema of control tables comprises an entity table having a plurality of fields including an identifier used as a primary key, and at least one of an associated data model, an entity name, an entity table name, a hierarchy relationship table name, and a hierarchy parent table name.

27. The system for creating the derived hierarchies of claim 19 wherein the schema of control tables comprises an attribute table having a plurality of fields including an identifier used as a primary key, and at least one of an associated entity, a domain of the associated entity, a type of attribute, a member type, a name of a foreign key column for the attribute, a display name of the attribute column and a data type of the attribute.

28. The system for creating the derived hierarchies of claim 19 wherein the schema of control tables comprises a hierarchy table having a plurality of fields including an identifier used as a primary key, and at least one of an associated entity, a hierarchy name and a mandatory identifier that indicates a forced participation of a plurality of members in a hierarchy.

29. The system for creating the derived hierarchies of claim 19 wherein the schema of control tables comprises a derived hierarchy table having a plurality of fields including an identifier used as a primary key, and at least one of a derived hierarchy name, and a data model associated with a derived hierarchy.

30. The system for creating the derived hierarchies of claim 19 wherein the schema of control tables comprises a derived hierarchy detail table having a plurality of fields including an identifier used as a primary key, and at least one of a master derived hierarchy record, a level number of the derived hierarchy, an associated entity, an associated attribute, a display name of the level, and a visible indicator for the level.

31. The system for creating the derived hierarchies of claim 30 wherein the visible indicator comprises a value that indicates whether a specific level of a derived hierarchy is to be displayed.

32. The system for creating the derived hierarchies of claim 19 wherein the component for interactively defining the hierarchies comprises a module for displaying a list of available levels of entities and hierarchies for user selection.

33. The system for creating the derived hierarchies of claim 32 further comprising a module for displaying a current hierarchy definition to the user.

34. The system for creating the derived hierarchies of claim 33 further comprising a module for enabling dragging of an available level from the list of available levels and dropping the available level in the current hierarchy definition display to add a new level to the current hierarchy definition.

35. The system for creating the derived hierarchies of claim 34 further comprising a module for displaying a preview of the derived hierarchy applied to the underlying data in the relational database.

36. The system for creating the derived hierarchies of claim 35 wherein the module that displays a preview of the derived hierarchy enables expansion and contraction of the derived hierarchy.

37. A computer program product comprising a memory device having computer readable code embedded therein for creating derived hierarchies for visualization and editing of data stored in a relational database, comprising:

program instructions that enable determining a plurality of data entities and relationships of a relational data model stored in the relational database;

program instructions that enable maintaining a plurality of information on structure of the relational database within a schema of control tables in the relational database;

program instructions that enable, using same user interface, interactively defining the derived hierarchies to impose on the relational data model stored in the relational database, wherein each of the defined derived hierarchies comprises levels that are interactively defined in either one of: a top to bottom manner and a bottom to top manner using the user interface and wherein after an entity for each level is defined, displaying and restricting in the user interface, choices for entities at a next level based on an attribute relationship of the data entities of the relational data model with the defined entity for each level;

program instructions for storing definition information for the defined derived hierarchies within the schema of control tables, wherein each of the defined derived hierarchies is usable to present a different hierarchical visualization of data of the relational data model stored in the relational database without duplication of data of the relational data model that is shared between multiple ones of the defined derived hierarchies:

program instructions that present a hierarchical visualization of data of the relational data model stored in the relational database on a user interface display using any one of the defined derived hierarchies; and program instructions that automatically edit data of the relational data model stored in the relational database by enabling editing of the hierarchical visualization of data presented on the user interface display.

38. The computer program product for creating the derived hierarchies of claim 37 wherein the program instructions that enable the editing of the hierarchical visualization of data comprise program instructions that enable at least one of a drag and drop, a copy and paste, and a cut and paste editing function to move a member in one of the derived hierarchies to a different location in the hierarchy.

39. The computer program product for creating the derived hierarchies of claim 37 wherein the program instructions that that enable defining the hierarchies utilize metadata stored in the relational database that enables hierarchy data visualization to render a specific hierarchy that is interpreted from an underlying data stored in the relational database.

40. The computer program product for creating the derived hierarchies of claim 37 wherein the data stored in the relational database is shared and referenced by each derived hierarchy.

41. The computer program product for creating the derived hierarchies of claim 37 wherein program instructions enable editing one of the derived hierarchies and also enables an underlying data to display a resulting change in the derived hierarchy immediately.

42. The computer program product for creating the derived hierarchies of claim 37 wherein each security and integrity constraint applied to the relational database is applied to each derived hierarchy.

43. The computer program product for creating the derived hierarchies of claim 37 wherein each derived hierarchy relies solely on an underlying data stored in the relational database and does not store the underlying data in a separate database conforming to the hierarchical structure of the derived hierarchy.

44. The computer program product for creating the derived hierarchies of claim 37 wherein the schema of control tables comprises an entity table having a plurality of fields including an identifier used as a primary key, and at least one of an associated data model, an entity name, an entity table name, a hierarchy relationship table name, and a hierarchy parent table name.

45. The computer program product for creating the derived hierarchies of claim 37 wherein the schema of control tables comprises an attribute table having a plurality of fields including an identifier used as a primary key, and at least one of an associated entity, a domain of the associated entity, a type of attribute, a member type, a name of a foreign key column for the attribute, a display name of the attribute column and a data type of the attribute.

46. The computer program product for creating the derived hierarchies of claim 37 wherein the schema of control tables comprises a hierarchy table having a plurality of fields including an identifier used as a primary key, and at least one of an associated entity, a hierarchy name and a mandatory identifier that indicates a forced participation of a plurality of members in a hierarchy.

47. The computer program product for creating the derived hierarchies of claim 37 wherein the schema of control tables comprises a derived hierarchy table having a plurality of fields including an identifier used as a primary key, and at least one of a derived hierarchy name, and a data model associated with a derived hierarchy.

48. The computer program product for creating the derived hierarchies of claim 37 wherein the schema of control tables comprises a derived hierarchy detail table having a plurality of fields including an identifier used as a primary key, and at least one of a master derived hierarchy record, a level number of the derived hierarchy, an associated entity, an associated attribute, a display name of the level, and a visible indicator for the level.

49. The computer program product for the derived hierarchies of claim 48 wherein the visible indicator comprises a value that indicates whether a specific level of a derived hierarchy is to be displayed.

50. The computer program product for creating the derived hierarchies of claim 37 wherein the program instructions that interactively enable defining the hierarchies comprise program instructions that display a list of available levels of entities and hierarchies for user selection.

51. The computer program product for creating the derived hierarchies of claim 50 further comprising program instructions that display a current hierarchy definition to the user.

52. The computer program product for creating the derived hierarchies of claim 51 further comprising program instructions that enable dragging an available level from the list of available levels and dropping the available level in the current hierarchy definition display to add a new level to the current hierarchy definition.

53. The computer program product for creating the derived hierarchies of claim 52 further comprising program instructions that display a preview of the hierarchy applied to the underlying data in the relational database.

54. The computer program product for creating the derived hierarchies of claim 53 wherein the program instructions that display a preview of the derived enables expansion and contraction of the derived hierarchy.

* * * * *